United States Patent

Freller et al.

[11] Patent Number: 4,508,430
[45] Date of Patent: Apr. 2, 1985

[54] ELECTROCHROMIC DISPLAY CELL I

[75] Inventors: Helmut Freller, Röthenbach; Friedrich Hörauf, Nuremberg; Hans-Peter Lorenz, Schwarzenbruck; Konrad Mund, Uttenreuth, all of Fed. Rep. of Germany

[73] Assignee: Siemens Aktiengesellschaft, Berlin and Munich, Fed. Rep. of Germany

[21] Appl. No.: 420,926

[22] Filed: Sep. 21, 1982

[30] Foreign Application Priority Data

Sep. 29, 1981 [DE] Fed. Rep. of Germany ....... 3138705

[51] Int. Cl.³ ................................................ G02F 1/23
[52] U.S. Cl. .................................................... 350/351
[58] Field of Search .......................... 350/357; 252/520

[56] References Cited

U.S. PATENT DOCUMENTS 4,279,726 7/1981 Baird et al. ...................... 204/192 P

FOREIGN PATENT DOCUMENTS 3011506 1/1981 Fed. Rep. of Germany .

Primary Examiner—John K. Corbin
Assistant Examiner—Lynn Vandenburgh Kent
Attorney, Agent, or Firm—Kenyon & Kenyon

[57] ABSTRACT

An electrochromic display cell is described which has a front electrode of tungsten trioxide layered on a support surface and a rear electrode of titanium nitride layered on a support surface. The rest potential and large capacity of the rear electrode permit a fast image cycle time at the front electrode and obviate the need to reverse potential polarity during cycling.

19 Claims, 2 Drawing Figures

ELECTROCHROMIC DISPLAY CELL I

BACKGROUND OF THE INVENTION

The invention relates to an electrochromic display cell which uses a tungsten trioxide front electrode, a rear electrode and an interspaced electrolyte. More specifically, the display cell employs a titanium nitride rear electrode which allows a fast cycle time for the display image.

Electrochromic displays are used to indicate alphanumeric characters and are generally designed as flat cells. The front electrode of a typical cell is made of a transparent front supporting surface such as glass, a transparent, electrically conductive layer such as indium oxide ($In_2O_3$), and a layer of electrochromic material. The electrochromic layer of the front electrode contacts an electrolyte which supplies the ions required for the electrochromic reaction of the electrochromic layer. The rear electrode may have a similar structure and the working layer, which may also be an electrochromic material, likewise contacts the electrolyte. The back supporting surface of the rear electrode may, however, be made of a metal plate such as aluminum, titanium, nickel or alloy steel and an electrochromic layer may be applied thereto.

In a typical imaging configuration, the front electrode of the cell has a plurality of individual, separated segments of the conductive and electrochromic layers. Each segment has its own electrical connector and together the segments are spatially arranged so that application of an electrical potential to a selected number of them will produce a particular alphanumeric character. The conductive and electrochromic layers of the rear electrode are not typically segmented but are uninterrupted over the entire rear electrode area. Alternatively, the entire cell including the front and rear electrodes may be segmented so as to produce an imaging configuration or several unitary cells may be spatially arranged in a similar manner.

It is known that the electrochromic material for the front electrode of electrochromic cells can be made from a number of inorganic compounds, see, for example, U.S. Pat. No. 3,819,252 and U.S. Pat. No. 3,827,784. Typically, tungsten trioxide ($WO_3$) is used. The rear electrode generally is made of tungsten trioxide or graphite in the form of paper, fabric or felt. The electrolyte may be present as a liquid, a gel or paste or as a solid. While sulfuric acid can and has been used as the electrolyte, an aprotic, non-aqueous solvent such as propylene carbonate, containing an alkali metal salt such as lithium perchlorate, $LiClO_4$ is also used as the electrolyte. See, for example, German Offenlegungsschrift No. 30 11 506, page 1, lines 3 to 15, and page 2, lines 20 to 25.

Electrochromic cells with tungsten trioxide front and rear electrodes may be of symmetrical or asymmetrical design. In a symmetrical design, the thickness of the tungsten trioxide layers is the same, for example, about 0.5 microns. In these cells, the image shown by the front electrode is produced or erased by reversing the polarity of the voltage. In an asymmetrical design, the tungsten trioxide layer of the rear electrode is substantially thicker than that of the front electrode; see, for example, the description in German Offenlegungsschrift No. 29 06 320 or the corresponding European Pat. No. 0 015 401. In the asymmetrical design, the tungsten trioxide layer of the rear electrode is maintained at a potential which causes coloration so that these segments of the front electrode which are short-circuited to the rear electrode, likewise become colored. Such an arrangement requires a driving voltage only to erase the image.

Rear electrodes of the foregoing types, however, still have specific shortcomings. A tungsten trioxide electrode in a symmetrically constructed cell does not settle to a stable potential during cycling and therefore makes continuous operation more difficult. In addition, the low capacity of this electrode is a disadvantage. In an asymmetrical design, the rear electrode is slightly polarized, but it must first be colored by application and maintenance of a potential. Because of the manufacturing costs to perform the vapor deposition of such thick tungsten trioxide layers, the asymmetric cells are also expensive. Graphite layers, which can also be employed as rear electrodes, exhibit good electrochemical properties, but are difficult to connect to electrical contacts, do not permit a fast cycle time and are costly to integrate into electrochromic cells.

SUMMARY OF THE INVENTION

It is an object of the invention, therefore, to provide an electrochromic display cell having front and rear electrodes and an electrolyte between them wherein the rear electrode has a rest potential relative to the potential range of the front electrode. A further object is to provide a device with a large capacity, and wherein its charge can be reversed in a short time.

According to the invention, these objects are achieved by a display cell having a front electrode made of a tungsten trioxide layer on an outer support surface, a rear electrode made of a titanium nitride layer on an outer support surface, and an electrolyte contacting the front and rear electrode layers.

The titanium nitride may be of the formula $TiN_x$ wherein x is selected from 0.6 to 1.4. A preferred titanium nitride is one wherein Ti and N are substantially present at a stoichiometric ratio.

The electrolyte may be any ion conductive medium which is chemically inert toward the front and rear electrode layers. The electrolyte may be a gel, paste, semi-solid or liquid and may be neat or in a matrix with a nonconductive net of inert material. Preferred electrolytes include an inert organic solvent and an inorganic, conductive salt such as lithium perchlorate, lithium stearate, alkali and alkaline earth metal salts and the like. Lithium perchlorate in an organic solvent is especially preferred.

A preferred embodiment of the invention is a display cell having a rear electrode composed of a single layer of porous titanium nitride of a density of from about 2 to 3 g per cc with about 2.5 g per cc being especially preferred.

A preferred embodiment of the invention is a display cell having a rear electrode composed of a double layer of dense titanium nitride and porous titanium nitride wherein the porous layer contacts the electrolyte, the dense layer contacts the support surface and the respective densities are about 5 g per cc and from about 2 to 3 g per cc with about 2.5 g per cc being especially preferred.

A further preferred embodiment is a display cell having the foregoing double layer rear electrode which further includes a layer of metallic titanium interspaced between the dense titanium nitride layer and the support surface.

An especially preferred embodiment is a display cell having a single or double layer rear electrode and an electrolyte of propylene carbonate and lithium perchlorate.

Yet another preferred embodiment is a display cell with a front electrode having a layer of indium oxide interspaced between the tungsten trioxide layer and the support surface.

DETAILED DESCRIPTION OF THE INVENTION

Figure 1:
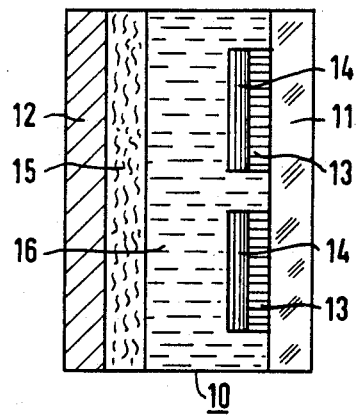
FIG. 1 depicts a side view of a display having a single layer rear electrode and a segmented front electrode.

The electrochromic display cell according to the invention has a front electrode made of an outer support surface and a tungsten trioxide layer, a rear electrode made of an outer support surface and a titanium nitride layer and an electrolyte contacting the layers. The reversible rear electrode has a large capacity and rest potential which is similar to the electrochromic cycling potential of the front electrode. As a result of the large capacity, the potential of the rear electrode undergoes minimal change during the electrochromic cycling reaction of the tungsten trioxide front electrode. For example, with a charge transport of about 10 mC per sq cm, there is only a minor change and this potential change is small as compared to that of the front electrode. In contrast to graphite electrodes, where the usefulness of the capacity is inhibited by the high diaphragm resistance of the porous graphite layer, the capacity of the titanium nitride rear electrode is readily available. This means that charge transport occurs quickly and the cycle time for the coloration reaction is therefore short.

The rest potential of the rear electrode of the invention corresponds to that of a decolorized or transparent tungsten trioxide electrode. By shorting the rear electrode with appropriate segments of the front electrode, this rest potential will produce a colorless state in these segments so that the image observed on the front electrode can be changed or cycled. The supply voltage polarity of the display therefore need not be reversed which reduces the energy requirement of the display. Furthermore, losses at the rear electrode are avoided, and the speed of image formation is substantially determined by the front electrode. In addition to these properties, the rear electrode has high electric conductivity and a large specific surface area, as well as being electrochemically inert.

According to the invention, the titanium nitride rear electrode for the electrochromic display can be formed as two layers as well as the single layer described previously. The first layer, which is adjacent to the electrolyte and faces the front electrode, comprises porous titanium nitride, while the second layer comprises dense titanium nitride. The porous titanium nitride, which is also the type used if a single titanium nitride layer is present, has a density of, for example, about 2 to 3 g/cc with about 2.5 g/cc being preferred while the dense titanium nitride has a density of about 5 g/cc. As compared to the dense titanium nitride, which is known as a wear-resistant, hard material, the porous titanium nitride, which has a large specific surface area, has approximately a 50% lower density.

In a further modification of the rear electrode of the electrochromic display according to the invention, a layer of metallic titanium can be arranged on the support surface of the rear electrode so as to interspace it between the support surface and the titanium nitride layer. This design is especially appropriate when the rear electrode comprises two titanium nitride layers. In this design, there is a continuous transition, starting from the outermost support surface from a layer of metallic titanium, through a dense, hard titanium nitride layer of high electric conductivity, to a porous, loosely stratified titanium nitride layer. Such a layered structure moreover allows the use of inexpensive metals as an outer support surface for the rear electrode.

The titanium nitride rear electrode will generally have a thickness of between 2 and 40 microns and preferably of about 15 microns. To produce the rear electrode, titanium nitride can be applied directly as a layer upon the glass or metal rear surface of the electrochromic display. By depositing the layer directly on the rear surface, a good electrical contact is assured and the electrical contact difficulties created for example by the use of felts or fabrics of graphite are avoided. Moreover, the titanium nitride rear electrode has a large internal surface which creates a large capacity, a desirable electrochromic potential and fast switching behavior in relation to such graphite rear electrodes.

The titanium nitride for the rear electrode layers is generally prepared by vapor phase deposition. In a typical example using this process titanium is vaporized from a titanium supply by means of an electron gun in an argon/nitrogen atmosphere and then, titanium nitride vapors are precipitated onto a sheet of titanium. For the preparation of the porous titanium nitride layer the nitrogen partial pressure employed during deposition will be between about $5 \times 10^{-3}$ and $10^{-1}$ mbar and preferably, about $5 \times 10^{-2}$ mbar. A nonporous layer will be obtained with lower nitrogen partial pressures between $2 \times 10^{-3}$ and $8 \times 10^{-3}$ mbar, about $3 \times 10^{-3}$ mbar being used preferably. In addition to the nitrogen partial pressure, the formation of dense and porous titanium nitride layers will also depend upon the ion current of the gas discharge which is established between the titanium sheet and the electron gun.

The invention shall be further explained through the description of embodiments shown by the two figures of the drawing and by a description of electrochemical tests performed upon an examplary display according to the invention.

In the embodiment shown by FIG. 1, the display 10 has a front plate (support surface) 11 of glass and a rear plate (support surface) of a glass or metal. To the front plate 11 is applied, on the side facing the rear plate 12, the tungsten trioxide layer in the form of individual segments 14. To make these segments, the glass is masked with an inert stencil formed in the outline of the individual segments and a contact layer 13 of indium oxide if first applied to the front plate 11 and thereupon a electrochromic layer 14 of tungsten trioxide is applied. The mask is removed to provide the individual segments. Alternatively, the segments may be electrically or mechanically produced from a continuous front electrode by machining or etching or a similar technique. The rear plate 12 is provided, on the side facing the front electrode, with a layer 15 of titanium nitride. The space between the front and the rear electrode is filled with an electrolyte 16 such as propylene carbonate/LiClO$_4$. A fabric, for instance, of zirconium oxide, may also be provided for receiving the electrolyte.

Figure 2:
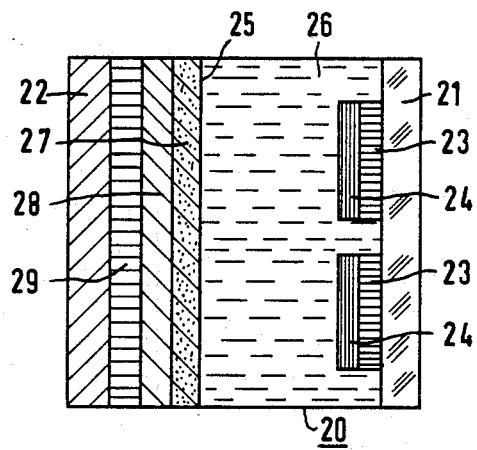
FIG. 2 depicts a side view of a display having a multi-layer rear electrode and a segmented front electrode.

In the embodiment shown by FIG. 2, the display 20 has a front plate 21 of glass and a rear plate 22 of metal. On the front plate 21 is first arranged a contact layer 23 and thereon, the electrochromic tungsten trioxide layer 24 in the form of segments. Opposite the tungsten trioxide front electrode is arranged the titanium nitride rear electrode 25, the electrolyte 26 being contained in space between the two electrodes. Rear electrode 25 has two layers 27 and 28. The layer 27 facing the front electrode is porous titanium nitride, while the layer 28, facing the rear plate 22, is dense titanium nitride. Furthermore, between the rear plate 22 and layer 28 there is layer 29 of metallic titanium.

Electrical conductivity, capacitance, half cell potential and current transport tests of the rear electrode were conducted using a titanium nitride rear electrode display cell designed according to the invention. An electrochemical half-cell arrangement, which compared the rear electrode of the cell to an external standard potential, was used to perform the measurements. The rest potential was measured against a lithium reference electrode. The impedance was determined at a small voltage amplitude ($V_{rms} = 10$ mV) by means of a frequency response analyzer and a potentiostat as a function of the frequency. The plate-shaped titanium nitride rear electrodes used were prepared by vapor deposition of porous nitride layers on titanium sheets or sheets of alloy steel.

According to these test measurements on the display cell containing the aprotic electrolytic propylene carbonate with 1M LiClO$_4$ (temperature: 22° C.), the titanium nitride rear electrode stabilized to a half cell potential relative to lithium of 3.2 V, i.e., the rest potential was 3.2 V, as measured against an external standard lithium reference electrode. This potential corresponded to the potential of the uncolored, bleached tungsten trioxide electrode. The double layer capacity of the electrode was shown to be very large. Using impedance measurements it was determined to be about 50 mF cm$^{-2}$ at a frequency of 1 Hz and using a rear electrode thickness of about 35 microns.

As expected based upon the foregoing measurement results, fast cycle electrochromic displays were built according to the invention using titanium nitride rear electrodes and tungsten trioxide front electrodes. The segments of the front electrode were bleached if they were short-circuited with the rear electrode, and they were colored within at most a second, if a voltage differential of 0.8 V was applied between the front and rear electrodes. In the cyclic potential jump at the tungsten trioxide front electrode, the potential of the titanium nitride rear electrode was changed by about 0.25 V.

What is claimed is:

1. An electrochromic display cell comprising a front electrode having a tungsten trioxide layer and an outer support surface, a rear electrode having a porous titanium nitride layer and an outer support surface, and an electrolyte contacting the tungsten trioxide and porous titanium nitride layers.

2. A cell according to claim 1 wherein the titanium nitride has the formula TiN$_x$ wherein x is selected from 0.6 to 1.4.

3. A cell according to claim 2 wherein the titanium nitride has the formula TiN.

4. A cell according to claim 1 wherein the density of the titanium nitride is from about 2 to 3 g per cc.

5. A cell according to claim 1 wherein the density of the titanium nitride is 2.5 g per cc.

6. An electrochromic display cell comprising a front electrode having a tungsten trioxide layer and an outer support surface; a rear electrode having an outer support surface and an inner double layer of titanium nitride, the layer contacting the outer support surface being dense and the inner layer facing the tungsten trioxide layer being porous; and an electrolyte contacting the tungsten trioxide and porous titanium nitride layers.

7. A cell according to claim 6 wherein the dense layer has a density of about 5 g per cc and the porous inner layer has a density of from about 2 to 3 g per cc.

8. A cell according to claim 6 wherein the porous inner layer has a density of 2.5 g per cc.

9. A cell according to claim 1 or 6 which further comprises a layer of metallic titanium interspaced between and contacting the outer support surface and the titanium nitride layer.

10. A cell according to claim 1, or 6 wherein the outer support surface of the front electrode is glass and the outer support surface of the rear electrode is metal or glass.

11. A cell according to claim 1, or 6 wherein the titanium nitride layer is from about 2 to about 40 microns thick.

12. A cell according to claim 1, or 6 wherein the titanium nitride layer is 15 microns thick.

13. A cell according to claim 1, or 6 wherein the tungsten trioxide layer comprises electrically distinct, individual segments, each having its own electrical contact.

14. A cell according to claim 13 wherein the segments are spatially arranged as a multiply indicating alphanumeric character.

15. A cell according to claim 1 or 6 which further comprises a contact layer of indium oxide interspaced between the tungsten trioxide layer and the outer support surface.

16. A cell according to claim 1 or 6 wherein the electrolyte is an inert organic compound containing an ionic inorganic salt.

17. A cell according to claim 16 wherein the salt is an alkali or alkaline earth metal salt.

18. A cell according to claim 17 wherein the salt is lithium perchlorate.

19. A cell according to claim 16 wherein the compound is propylene carbonate.

* * * * *